Aug. 21, 1951  E. A. REHWALD  2,564,816
MOTION CONVERTING MECHANISM
Filed Sept. 13, 1949
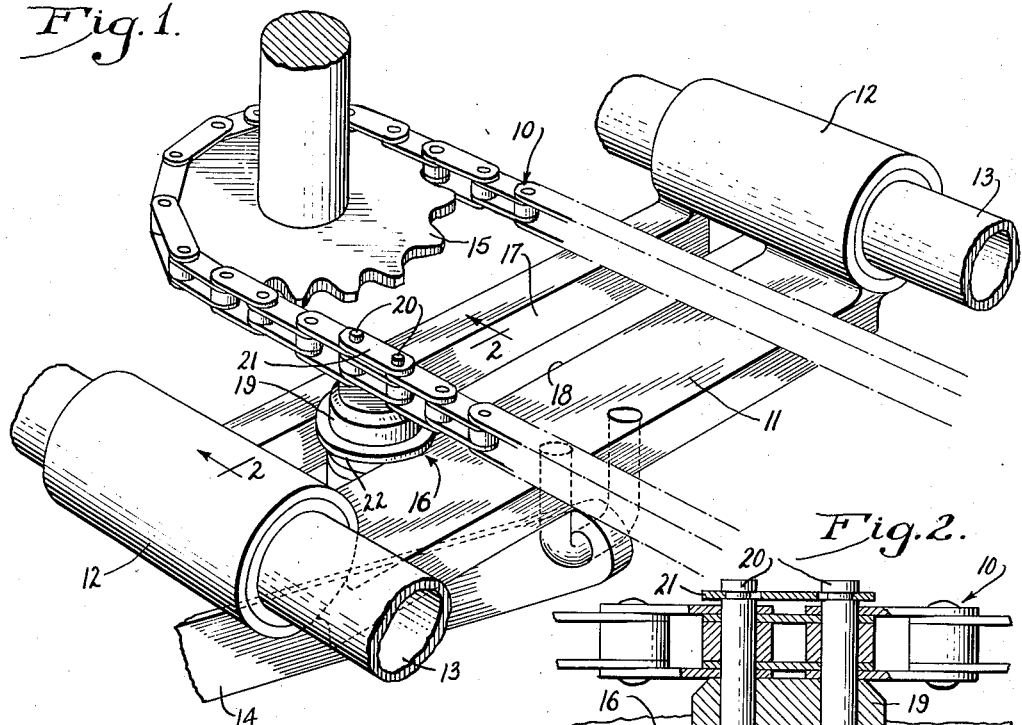
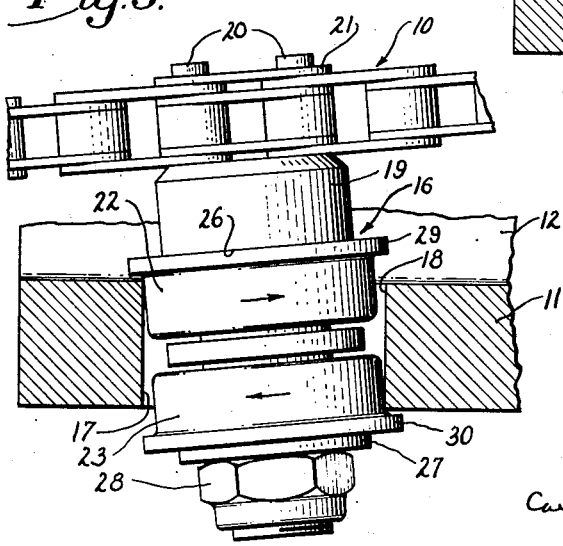
INVENTOR.
Edmund A. Rehwald
BY
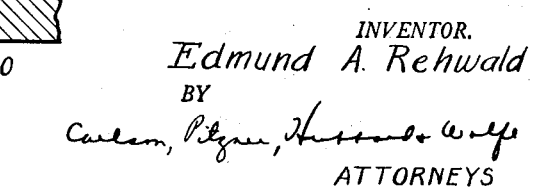
ATTORNEYS Patented Aug. 21, 1951

2,564,816

UNITED STATES PATENT OFFICE 2,564,816

MOTION CONVERTING MECHANISM

Edmund A. Rehwald, Rockford, Ill., assignor to Barber-Colman Company, Rockford, Ill., a corporation of Illinois Application September 13, 1949, Serial No. 115,399

4 Claims. (Cl. 74—37)

This invention relates generally to motion converting mechanisms adapted for use in actuating doors or other reciprocating parts and more particularly to a mechanism in which the rotary motion of a unidirectional motor is converted to reciprocating motion of a guided part through the medium of connecting member of stud projecting rigidly from a flexible drive element such as an endless chain and engageable with and movable along oppositely facing surfaces on the guided part which is disposed adjacent the chain and linked to the door or other member to be actuated.

The primary object of the invention is to provide a motion converting mechanism of the above type having a driving member which may be tilted relative to the oppositely facing surfaces on the guided part and still move freely along the latter without binding.

Another object is to effect freedom of movement between the connecting member or stud and the oppositely facing surfaces by means of a plurality of rotary elements journaled on the member and respectively engageable with the different surfaces when the member becomes tilted.

A more detailed object is to transmit motion from the chain to the guided part or car by means of a stud having two axially spaced rollers journaled thereon for engagement respectively with the opposed walls of a cross-slot on the car.

Other objects and advantages of the invention will become apparent from the following detailed description taken in connection with the accompanying drawings, in which:

Figure 1 is a perspective view of a power transmitting mechanism embodying the present invention.

Fig. 2 is a fragmentary sectional view taken in the plane of the line 2—2 of Fig. 1.

Fig. 3 is a fragmentary side elevation of the motion transmitting stud showing a tilted position of the parts.

The invention is especially adapted for use in a mechanism for converting the rotary motion of a unidirectional electric motor (not shown) into a reciprocatory motion suitable for operating closure members such as garage doors or the like by means of a flexible drive element, such as an endless chain 10 having a driving connection with a carriage or car 11 guided for movement back and forth along a rectilinear path and connected to a garage door or other part to be reciprocated. As shown, the car comprises a generally flat plate rigid at opposite ends with bearing sleeves 12 which are slidable along spaced parallel guide rods 13. Through the medium of a link 14 or other suitable connection, the motion of the car may be transmitted to a door or other part to be operated.

The chain 10 lies in a plane paralleling the path of reciprocation of the car and is disposed adjacent the car on the side of the latter opposite the actuating link. Opposite end portions of the chain loop mesh with and extend around and are supported by sprockets 15 rotatably mounted on a suitable framework (not shown). One of the sprockets is driven by the unidirectional motor during the operation of which the straight parallel runs of the chain move in opposite directions along parallel paths and each link of the chain, in passing from one path to the other, traverses an intervening arcuate or semi-circular path which is defined by the sprocket 15.

The chain is connected to the car 11 through the medium of a drive member 16 which projects from the chain toward the car for engagement with one surface 17 thereon against which the member bears to push the car in one direction while traversing one of its straight paths and a second oppositely facing surface 18 against which the member bears in pushing the car in the opposite direction while traversing the other straight path. The surfaces 17 and 18 are disposed in planes perpendicular to the path of reciprocation of the car 11 and, to permit the drive member to move around the sprocket in passing from one run of the chain to the other, the surfaces are elongated in a direction transversely of the car. When, as shown herein, the drive member comprises a single projection, the surfaces 17 and 18 face toward each other and constitute the walls of a cross-slot in which the drive member fits quite closely in order to minimize the backlash or looseness in the connection between the chain and the car. Operation of the door or other part with a jerky motion is thus avoided. While the drive member 16 may in some instances be journaled on the chain, it is preferably made rigid with the latter and in the present instance includes a stud 19 abutting at one end against the side of one of the links of the chain 10 and secured rigidly to the latter by pins 20 which are pressed into the end of the stud and may be used advantageously as the pivots for joining the stud link to the overlapping ends of the adjacent links. The pins are held in place by a snap link 21 fitting over the other ends of the pins.

While the chain link which supports the drive member 16 does mesh with the teeth of the sprocket 15 in passing around the arcuate portion of its path, it is not guided accurately. Therefore, owing to the flexibility of the chain, the stud 19 tends to tilt laterally under the bending stresses to which it is subjected due to off-setting of the car 11 from the plane of the chain 10. Under these conditions one part of the stud engages one edge of one of the walls of the slot and another part of the stud axially spaced from the first part engages the opposite edge of the other wall of the slot.

The present invention aims to avoid any danger of bending or locking of the stud in the cross-slot under such conditions and to insure free movement of the stud along the slot walls. This is accomplished through the provision of two independently rotatable elements 22 and 23 mounted on the stud in such manner that when the stud is tilted from its axis one element engages one wall of the slot and the other element engages the other wall so as to provide rolling contact at both points of engagement between the stud and the car.

In the present instance, the rotary elements 22 and 23 are rollers which are slightly smaller in diameter than the width of the slot and which are journaled in end to end relation onto a cylindrical bearing surface 24 intermediate the ends of the stud. Preferably, suitable bushings 25 are interposed between the rollers and the bearing surface 24 to reduce wear on the rollers. A shoulder 26 formed in the upper portion of the stud defines the upper end of the bearing surface and limits movement of one roller 22 upwardly with respect to the stud while movement of the other roller 23 downwardly is limited by engagement of the roller with a washer 27 which is held in place against the lower end of the bearing surface by a nut 28 threaded onto the projecting end of the stud. If desired, a washer 29 may be interposed between the adjacent ends of the rollers to keep the latter out of rubbing engagement with each other.

Means is provided on the rollers and on the car which coact to limit axial shifting of the rollers relative to the slot walls so as to avoid any possibility of the rollers being forced out of the slot in the event of excessive wearing of the rollers or the walls in service use. One of these means is in the form of a flange 29 which in this instance is on the roller 22 and coacts with surfaces on the top of the car adjacent the edges of the slot and the other means is a flange 30 on the other roller 23 coacting with surfaces on the bottom of the car adjacent the slot.

With the chain moving along its path in a clockwise direction and the stud moving with the chain 10 along one of the parallel paths as viewed in Fig. 1, the rollers 22 and 23 engage the wall 17 to move the car 11 along the rods 13 toward the sprocket 15. Due to the flexibility of the chain and the resistance of the car to movement along the guide rods, the stud is subjected to bending stresses and is tilted slightly out of parallelism with respect to the walls. In the continued movement of the chain from the position shown in Fig. 1, the stud moves around the sprocket and longitudinally of the slot with one roller engaging and rolling along each of the respective slot walls (see Fig. 3). Thus, the upper roller 22 engages and rolls along the upper edge of the wall 17 and the roller 23 engages and rolls along the lower edge of the other wall 18, the degree of tilt being slightly exaggerated for purposes of illustration. With the stud moving along the walls in a direction away from the observer as viewed in Fig. 3, the rollers rotate about the axis of the stud in the opposite directions indicated by the arrows. As the stud moves from the curved path around the sprocket into the other parallel path of the chain, its movement longitudinally of the slot stops and the rollers both act against the wall 18 to urge the car along the rods in a direction away from the sprocket.

The motion converting mechanism above described enables the stud to move freely along the slot so as to eliminate binding between the two even during tilting of the stud out of parallelism with respect to the slot walls. This desirable action is made possible by the use of the two independently rotatable rollers which are adapted to engage the respective slot walls and are free to rotate in opposite directions on the stud thereby providing rolling contact and a consequent reduction of friction between the stud and the slot walls.

I claim as my invention:

1. The combination of an elongated flexible power driven member movable successively along spaced parallel paths through a semi-circular connecting path, a car guided for movement back and forth along a rectilinear path parallel to and spaced from the plane of said parallel paths, said car having a cross-slot with opposed parallel walls extending transversely of said paths, a stud secured to said member and projecting laterally of the member and the slot and in between said opposed walls, and two axially spaced rollers journaled on said stud and adapted to engage opposite edge portions of said walls, said stud and said rollers being movable along said slot as the stud moves around said semi-circular path with one of the rollers engaging an edge portion of one of said walls and the other roller engaging the opposite edge portion of the other wall when the stud is tilted out of parallelism with respect to the walls.

2. The combination of an elongated flexible power driven member movable successively along spaced parallel paths through a semi-circular connecting path, a car guided for movement along said parallel paths and having thereon spaced parallel guide walls lying in planes perpendicular to said parallel paths, a stud disposed adjacent said walls and projecting rigidly from said member, and two rollers journaled on said stud in end to end relation and respectively engageable with opposite edge portions of the different guide walls when the stud is canted out of parallelism with respect to the walls.

3. The combination of an elongated flexible drive element movable along a path including an arcuate portion, a car guided for movement along a path spaced from said drive element, said car having a cross-slot with opposed walls extending transversely of the car motion, a stud secured to and projecting from said element into the space between said walls, said stud being movable in a direction longitudinally of said slot as the stud is moving around said arcuate portion of said path with said element, and two axially spaced rotary elements on said stud positioned to engage opposite edge portions of said opposed walls with one of said rotary elements adapted to roll along one of said walls and the other rotary element adapted to roll along the other wall upon tilting the axis of said stud during the movement of the stud along the slot.

4. The combination of an elongated flexible power driven element movable along a path lying in a plane and including an arcuate portion, a car guided for movement back and forth in a plane spaced from the plane of said path and having guide walls extending transversely of the car motion and facing in opposite directions, a member secured to said element and projecting therefrom to a position adjacent said walls, said member being movable longitudinally of said walls during its movement with said element around said arcuate portion of said path, and two rollers journaled on said member and engageable respectively with said oppositely facing guide walls.

EDMUND A. REHWALD.

REFERENCES CITED

The following references are of record in the file of this patent:

UNITED STATES PATENTS

| Number | Name | Date |
| --- | --- | --- |
| 34,400 | Barden | Feb. 18, 1826 |
| 399,593 | Worth | Mar. 12, 1889 |
| 1,097,333 | Kinmont | May 19, 1914 |
| 1,128,545 | Swanson | Feb. 16, 1915 |
| 1,641,067 | Connelly | Aug. 30, 1927 |